United States Patent [19]

Seki et al.

[11] Patent Number: 4,942,350

[45] Date of Patent: Jul. 17, 1990

[54] METHOD OF CREATING NC DATA FOR GROOVING

[76] Inventors: Masaki Seki, 3-15-2-406, Takaido-nishi, Suginami-ku, Tokyo 168; Koji Samukawa; Osamu Hanaoka, both of Fanuc Dai-3 Virakaramatsu, 3527-1, Shibokusa, Oshino-mura, Minamitsuru-gun, Yamanashi 401-05, all of Japan

[21] Appl. No.: 347,894

[22] PCT Filed: Aug. 26, 1988

[86] PCT No.: PCT/JP88/00852

§ 371 Date: Apr. 10, 1989

§ 102(e) Date: Apr. 10, 1989

[87] PCT Pub. No.: WO89/02106

PCT Pub. Date: Mar. 9, 1989

[30] Foreign Application Priority Data

Aug. 26, 1987 [JP] Japan .................. 62-212350

[51] Int. Cl.$^5$ ............................................. G05B 19/18
[52] U.S. Cl. ................................ 318/569; 318/568.1; 364/191; 364/167.01; 364/474.29
[58] Field of Search ................ 318/569, 568.1; 364/171, 191

[56] References Cited

U.S. PATENT DOCUMENTS

| | | | |
|---|---|---|---|
| 4,491,906 | 1/1985 | Kishi et al. | 364/191 |
| 4,569,014 | 2/1986 | Kishi et al. | 364/191 |
| 4,723,203 | 2/1988 | Kishi | 364/171 |
| 4,755,927 | 7/1988 | Kishi et al. | 364/191 |

Primary Examiner—William M. Shoop, Jr.
Assistant Examiner—Saul M. Bergmann

[57] ABSTRACT

NC data for grooving are created by inputting a groove shape (GR) which lies on a three-dimensional curved surface as well as a groove-depth specifying curve (GRC) which indicates a relationship between a distance d from one end and groove depth hk of a point at this distance, obtaining the distance dk from one end of the groove-depth specifying curve (GRC) in accordance with $$dk = lk \cdot Lj/Li$$

where Li represents the total length of the groove shape, lk the distance from one end of the groove shape and Lj the total length of the groove-depth specifying curve (GRC), obtaining, from the groove-depth specifying curve, the depth hk at the distance dk from the abovementioned one end, and adopting the groove depth hk as groove depth of a point at the distance lk from the one end of the groove shape (GR).

5 Claims, 5 Drawing Sheets

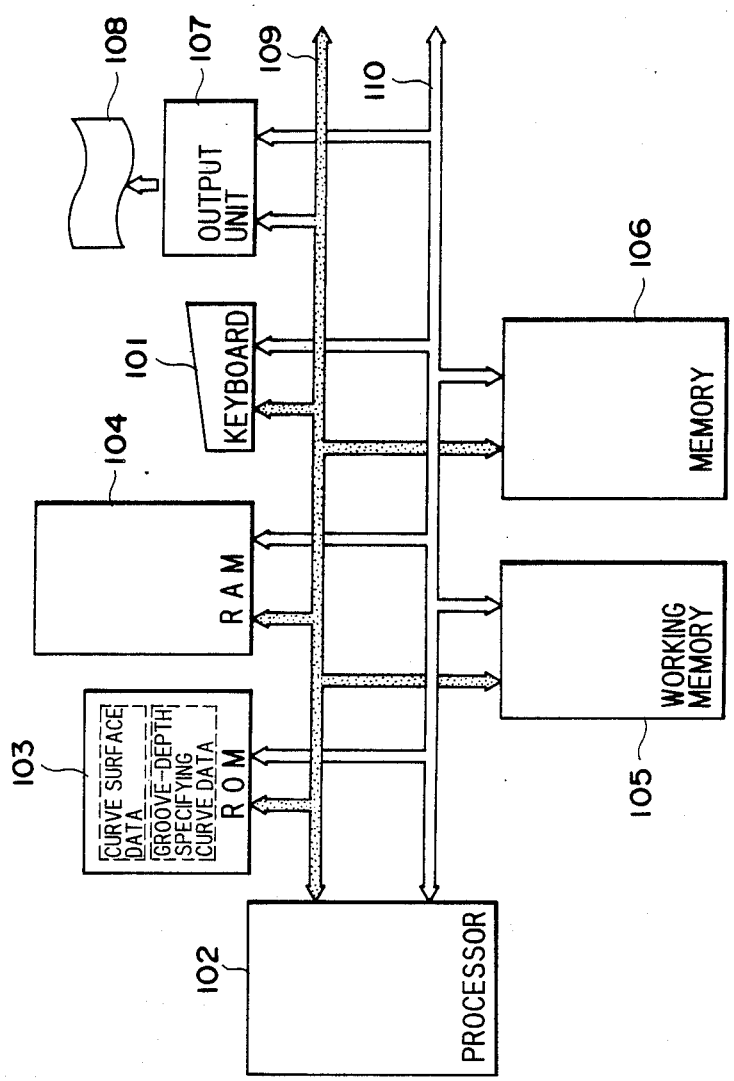

METHOD OF CREATING NC DATA FOR GROOVING

TECHNICAL FIELD

This invention relates to a method of creating NC data for grooving. More particularly, the invention relates to a method of creating NC data for grooving in cases where groove depth varies, wherein use is made of groove curve data specifying a groove shape on a three-dimensional curved surface and groove depth data (a groove depth pattern) specifying the depth of the groove.

BACKGROUND ART

There are cases where it is desired to cut a groove in a three-dimensional curved surface.

FIG. 6 is a view for describing a prior-art example of such grooving machining. SS denotes a three-dimensional curved surface, GR a groove, and Mk (k=1, 2, ...) a series of points on the three-dimensional curved surface specifying the groove GR. Grooving machining entails obtaining the coordinates of the series of points Mk specifying the groove GR, subsequently obtaining the coordinates of a series of points lower than the abovementioned coordinates by the dimension h of groove depth along the $-Z$ axis, creating NC data based on these coordinates, and cutting the groove based on the NC data.

In the prior art, the groove depth dimension h is fixed at all times. Consequently, the coordinates of the series of points on the groove bottom can be obtained automatically and the NC data for grooving can be created with ease. However, if the groove depth dimension h varies, the coordinates of the series of points on the groove bottom cannot be found automatically but must be calculated manually by the operator. Accordingly, creating NC data for cutting a groove having a varying depth is a troublesome task.

SUMMARY OF THE INVENTION

An object of the present invention is to provide a grooving NC data creation method through which NC data for cutting a groove can be created in a simple manner even if groove depth varies.

NC data for grooving are created by: (a) inputting a groove shape which lies on a three-dimensional curved surface as well as a groove-depth specifying curve which indicates a relationship between a distance d from one end of the groove and groove depth hk of a point at this distance, (b) obtaining the distance dk from one end of the groove-depth specifying curve in accordance with $$dk = lk \cdot Lj/Li$$

where Li represents the total length of the groove shape, lk the distance from one end of the groove shape and Lj the total length of the groove-depth specifying curve, (c) obtaining, from the groove-depth specifying curve, the depth hk at the distance dk from the above-mentioned one end, and (d) ng the groove depth hk as groove depth of a point at the distance lk from the end of the groove shape.

BRIEF DESCRIPTION OF THE DRAWINGS

FIG. 2 is a block diagram of an apparatus for practicing the method of the invention;

DESCRIPTION OF THE PREFERRED EMBODIMENT

Figure 1A:
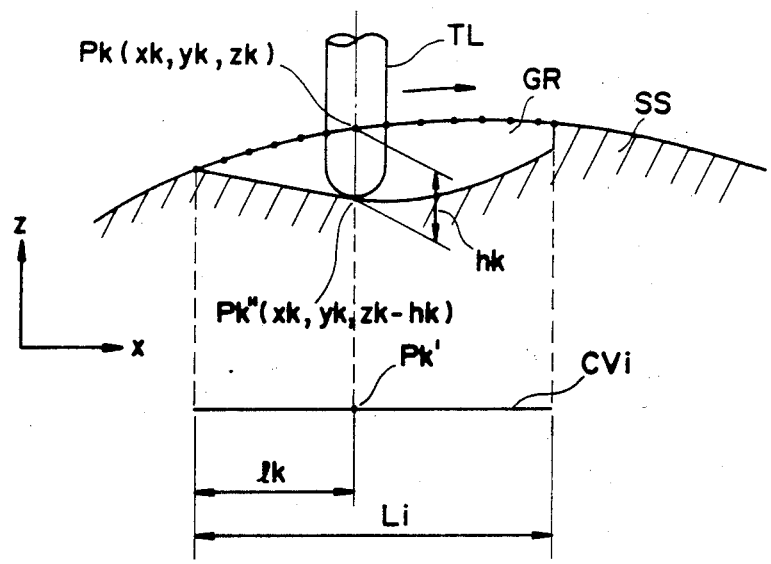
FIGS. 1(a) and 1(b) schematic explanatory views of the method of the present invention.
Figure 1B:
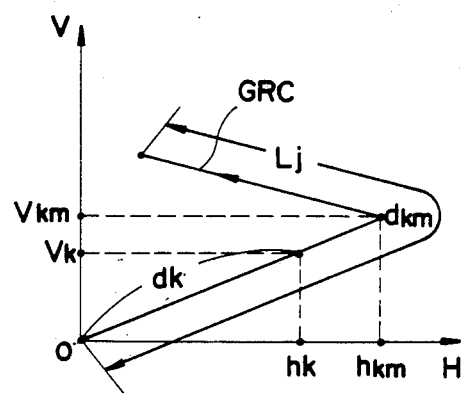

FIGS 1(a) and 1(b) are schematic explanatory views of the method of the present invention. FIG. 1(a) is a sectional view in an X-Z plane illustrating the shape of a groove, and FIG. 1(b) is an explanatory view of a groove-depth specifying curve (groove depth pattern) which indicates the relationship between a distance dk from one end of the groove and a groove depth hk.

SS represents a three-dimensional curved surface, GR a groove, TL a tool, CVi a planar curve on the X-Y plane for specifying groove shape, GRC a groove-depth specifying curve (groove depth pattern) on the H-V plane, Pk a point on the curved surface SS of the groove GR, Pk' a projected point obtained by projecting the point Pk onto CVi, Pk" a machining point on the groove bottom and corresponding to the point Pk, Li the total length of the planar curve CVi, and Lj the total length of the groove-depth specifying curve GRC. It should be noted that groove depth gradually becomes larger from 0 up to a certain distance dkm and then gradually becomes smaller.

FIG. 2 is a block diagram of an automatic programming apparatus for practicing the method of the present invention. Numeral 101 denotes a keyboard for data input, 102 a processor, 103 a ROM for storing a control program, 104 a RAM, 105 a working memory, 106 a memory for storing grid points of meshes specifying the curved surface SS and created NC program data for grooving machining, 107 an output unit for outputting to an external storage medium 108 such as a paper tape or magnetic tape, the created NC program data for grooving machining, 109 an address bus, and 110 a data bus.

Figure 3:
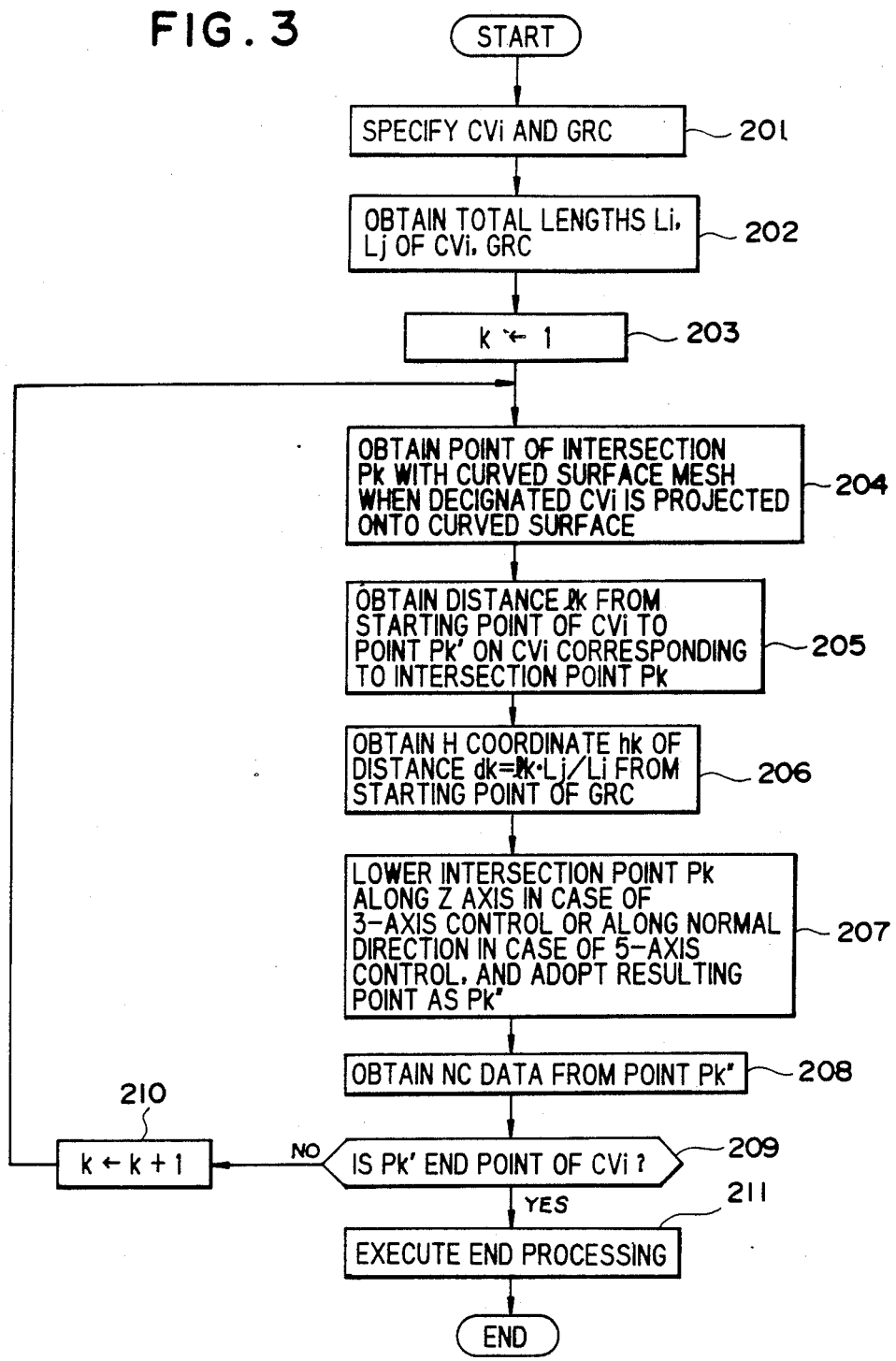
FIG. 3 is a flowchart of processing according to the method of the invention.
Figure 6:
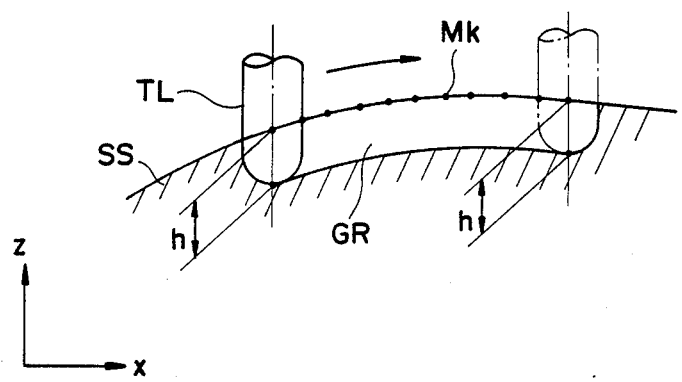
FIG. 6 is a view for describing the method of the prior art.

FIG. 3 is a flowchart of processing for creating NC data for grooving in accordance with the method of the present invention. The method of the present invention will now be described in accordance with the flowchart of FIG. 3. It is assumed that the three-dimensional curved surface SS has been specified by a number of meshes and that the curved surface has already been stored in the RAM 104. As for the method of specifying the three-dimensional curved surface SS, refer to FIG. 6 as the related description in the specification of International Application PCT/JP86/00100 (filed on February 28, 1988 and entitled "Method of Creating Complex Curved Surfaces"). Further, it is assumed that several types of groove-depth specifying curves [see FIG. 1(b)] also have been stored in the RAM 104, and that it is arranged so that the operator can make a selection in accordance with the shape of the groove.

First, the operator considers the shape of the groove to be machined, selects a predetermined specifying curve, e.g., the groove-depth specifying curve GRC shown in FIG. 1(b), from among the several types of groove-depth specifying curves prepared. The operator then enters, from the keyboard 101, the planar curve CVi, which is obtained by projecting the groove shape GRC to be formed on the curved surface SS onto the X-Y plane (step 201).

The processor 102 obtains the total length Lj of the designated groove-depth specifying curve GRC and the total length Li of the entered planar curve CVi (step 202), and performs the following operation (step 203):

$$k \leftarrow 1$$

Figure 4:
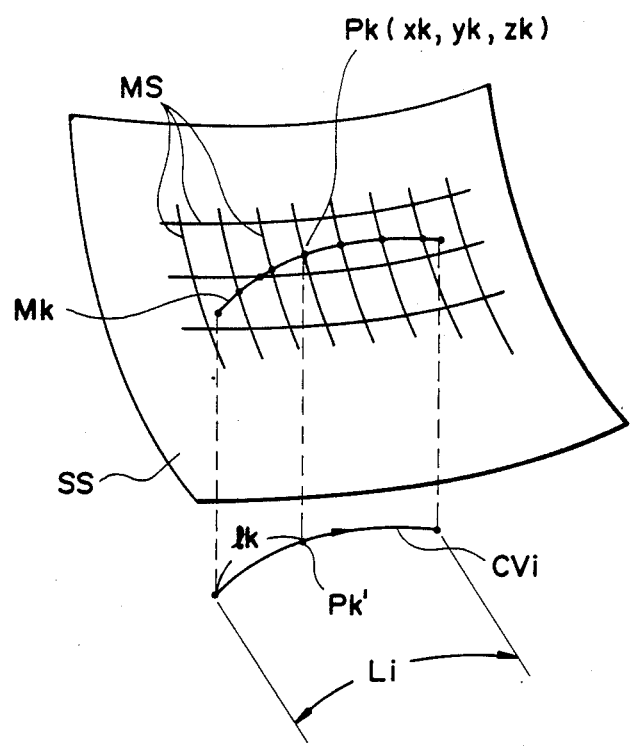
FIGS. 4 and 5(a) and 5(b) are views for describing the method of the present invention.

Next, the processor 102 projects a k-th point Pk', at a predetermined pitch, onto the planar curve CVi of the three-dimensional curved surface SS. The process 102 then obtains and stores the coordinates (xk,yk,zk) of the point Pk at the intersection with a mesh MS (see FIG. 4) for specifying the three-dimensional curved surface SS stored in the RAM 104 (step 204), and obtains a distance lk from the starting point of the planar curve CVi to the point Pk' (step 205). For a method of calculating the intersection point Pk, see FIG. 7 and the related description in the abovementioned International Application PCT/JP86/00100.

Next, the distance dk from one end of the groove-depth specifying curve GRC corresponding to the distance lk is obtained in accordance with the equation $$dk = lk \cdot Lj/Li$$

The groove depth dimension hk at the distance dk is obtained from the groove-depth specifying curve GRC, and the groove depth dimension hk is adopted as the groove depth of point Pk on the three-dimensional curved surface SS (step 206).

Figure 5A:
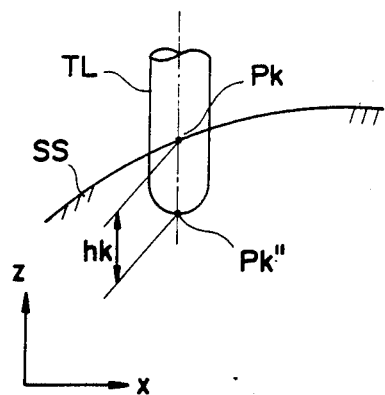
Figure 5B:
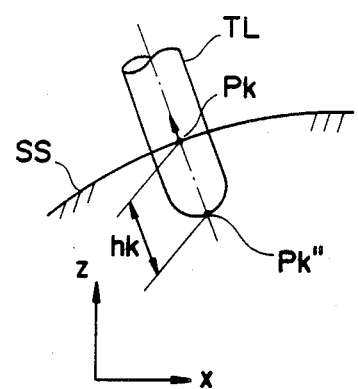

Thereafter, if the tool TL is capable of being moved by simultaneous three-axis control along the X, Y and Z axes, the coordinates (xk,yk,zk-hk) of the point Pk'' located below the point Pk by the groove depth dimension hk along the $-Z$ axis, as shown in FIG. 5(a), are obtained. If the tool TL is capable of being moved by simultaneous five-axis control along the X, Y, Z axes, a horizontal rotational axis (B axis) and a vertical rotational axis (C axis), then the tool is controlled in such a manner that the vector of the central axis of the tool will point in the direction of the normal line at the point Pk, as shown in FIG. 5(b). Therefore, the point Pk'' is obtained (step 207), which point is lower than Pk by the groove depth dimension hk along the direction of the normal line. NC data are obtained by adopting the point Pk'' as a machining point, and the data are stored in the memory 106 (step 208).

The processor 102 determines whether the point Pk' is the end point on the planar curve CVi (step 209). If point Pk' is not the end point, then the operation $$k \leftarrow k + 1$$

is performed (step 210) and processing from step 204 onward is repeated. If Pk' is the end point, end processing, such as withdrawing the tool TL a designated distance from the curve surface SS, is executed (step 211).

In the foregoing, the groove depth dimension hk is obtained by using the total length Li of the planar shape obtained by projecting the groove shape to be machined on the curved surface SS onto a predetermined plane, as well as the distance lk from one end of the planar shape. However, it is permissible to adopt an arrangement in which the groove depth dimension hk is obtained by adopting Li as the total length of the actual groove shape on the curved surface, and using the distance lk from one end of the groove shape.

Thus, in accordance with the invention, the arrangement is such that NC data for grooving are created by specifying a groove shape GR which lies on a three-dimensional curved surface as well as a groove-depth specifying curve which indicates a relationship between a distance d from one end and groove depth hk of a point at this distance, obtaining the distance dk from one end of the groove-depth specifying curve in accordance with $$dk = lk \cdot Lj/Li$$

where Li represents the total length of the groove shape, lk the distance from one end of the groove shape and Lj the total length of the groove-depth specifying curve, and adopting the groove depth hk at dk as the groove depth of a point at the distance lk from the one end of the groove shape. This makes it possible to simply create NC data for cutting a groove having a varying depth.

We claim:

1. A method of creating NC data for grooving a three-dimensional curved surface, comprising the steps of:
   specifying a groove shape which lies on the three-dimensional curved surface;
   specifying a groove-depth specifying curve defining a relationship between a distance dk measured from one end of said groove shape and a groove depth hk of a point at said distance dk;
   obtaining said distance dk in accordance with $$dk = lk \cdot Lj/Li$$

where Li represents a total length of said groove shape, lk represents a distance from said one end of said groove shape and Lj represents a total length of said groove-depth specifying curve;
   obtaining, based on said groove-depth specifying curve, said groove depth hk at said distance dk; and
   creating NC data for said grooving at said distance dk based on said groove depth identifying a groove depth of a point at the distance lk from said one end of said groove shape.

2. A method of creating NC data for grooving according to claim 1, further comprising the steps of:
   selecting said total length Li to represent a total length of said groove shape projected onto a predetermined plane; and
   selecting said distance lk to represent a distance from one end of said projected shape.

3. A method of creating NC data for grooving according to claim 2, storing a plurality of groove-depth specifying curves; and
   specifying a groove-depth specifying curve by selecting a predetermined one of the stored groove-depth specifying curves.

4. A method of creating NC data for grooving the three-dimensional curved surface with a tool according to claim 2, further comprising the step of:
   performing grooving in accordance with said NC data so that a distal end of the tool is lowered by hk at said distance lk.

5. A method of creating NC data for grooving according to claim 2, further comprising the step of:
   performing grooving in accordance with said NC data so that the tool is oriented normal to the three dimensional curved surface by simultaneous five-axis control, and so that a distal end of the tool is lowered by hk along the normal direction.

* * * * *